3,158,577
METHOD OF TREATING RADIOACTIVE WASTE
Lane A. Bray and Earl C. Martin, Richland, Wash., assignors to the United States of America as represented by the United States Atomic Energy Commission
No Drawing. Filed June 20, 1963, Ser. No. 289,452
1 Claim. (Cl. 252—301.1)

The invention relates to a novel method of treating radioactive waste solutions produced in the reprocessing of spent fuel elements from nuclear reactors, more particularly to a method of reducing the nitric acid, nitrous and nitrate ion content of such solutions.

Following the extraction of the uranium and plutonium values from a solution of neutron-irradiated nuclear fuel elements, the resulting waste solutions present a difficult problem of disposal. Due to their content of nuclear fission products, the solutions have a dangerous level of radioactivity, which is complicated by their high acidity, which was originally required to dissolve the fuel elements.

If it is attempted to reduce the volume of such a solution by evaporation, the concentration of the acid, such as nitric acid, soon becomes so great that containment problems arise due to the corrosion.

The present expedient in this situation is to neutralize the acid of the solution with an inorganic base such as sodium hydroxide. This reduces the corrosiveness of the solution by contracting its acidity, but it has the drawback of adding a large number of metallic ions, so that when the solution is calcined later on to solid form the volume of the solids is vastly increased. The magnitude of this increase can be appreciated when it is recalled that the fission products, though present in highly significant amounts in the radioactive sense, are in very low concentrations from the chemical standpoint, on the order of centimoles and millimoles; thus, when an inorganic base such as sodium hydroxide is added to neutralize an acid having a molarity on the order of several whole units, the solids content of the ultimate waste is thereby increased by a factor in the hundreds or even the thousands.

An alternative solution to the problem created by the acid of waste solutions has been to treat it with an organic compound such as formaldehyde. This has been attended by numerous practical difficulties including uncertainty in controlling the rate of the reaction, foaming, toxic hazards, and polymerization of the formaldehyde. The last named is exceptionally serious in the lines of radioactive solution processing equipment which, for reasons of safety, have to be buried in concrete, or otherwise heavily shielded.

It is, accordingly, the general object of the invention to provide a method of treating radioactive waste solutions from nuclear reactor fuel reprocessing.

It is a more particular object to provide a method of removing nitric acid and nitrate ions from such solutions without adding a large number of metallic ions.

Other objects will appear as the description proceeds.

The foregoing objects have been attained by our discovery that sugar, when introduced into radioactive waste solutions at temperatures above 84° C. and below boiling, makes an effective agent for removing nitric acid, nitrous and nitrate ions. This is contrary to prior beliefs, since it was considered necessary for temperatures to be at least 220° for sugar to be effective in this situation. We have found that if the solution is held at a temperature of between 84° C. and the boiling point for at least four minutes after the introduction of the sugar, thereafter if the solution is held at a temperature between 50° C. and its boiling point, the nitric acid may be eliminated to any extent desired.

At the same time we have found that it is important that the temperature be maintained for a time such that the sugar is substantially destroyed. We have found that if sugar remains there is danger of explosion when the residue is calcined. Because of the low temperatures employed in our process this hazard is avoided. Furthermore, because our process substantially destroys all the sugar it avoids the formation of gummy deposits which tend to clog equipment lines, which are buried in concrete or otherwise heavily shielded due to the radioactivity of the substances being handled.

The exact chemical mechanism of the working of our process of nitric acid, nitrous and nitrate ion elimination has not been fully determined. It could be looked upon as essentially a reducing action by the sugar whereby the lower oxides of nitrogen are produced and escape from the solution in gaseous form, since brown colored fumes are observed above the solution when the process is being carried out. Yet, we have found that sparging the solution with air after introducing the sugar does not interfere with the action as might be expected if it were simply one of reduction, but actually reduces the period of induction of the reaction by about a factor or two. Another indication that the reaction has an oxidative aspect as well as one of reduction is that the presence of iron ions increases the efficiency of the reaction. Furthermore, the radioactivity of the solution may well be a factor in the chemical behavior involved; there is reason to believe that the success we have had in eliminating carbonaceous deposits, as well as the completeness of the main reaction may well be attributed to radiation effects that have as yet to be fully investigated. Because of all these facts, our invention is offered empirically, and is not to be considered bound by any theoretical explanation of its operation.

Our invention has several advantages, some of them quite surprising, over previously known methods utilizing organic materials to eliminate nitric acid, nitrous and nitrate ion.

It does not require neutralization as do previously known methods employing sugar as a reactant. It also, as above indicated, operates at lower temperatures, and eliminates potentially explosive carbonaceous and gummy residues.

In contrast to the processes employing formaldehyde, our method is more efficient, and the reaction is smoother and more easily controlled. Because of this fact, the equipment needed to carry it out may be simpler and less expensive; no reaction tower is required as in the formaldehyde process, and the reaction may take place entirely within a liquid-containing vessel, yet it is sufficiently vigorous to be carried out within a reasonable time. No polymerization problems arise, and, of course, the sugar used in our process is much easier to handle and store than formaldehyde, and accidental spills have less serious consequences. The latter consideration is important in a remote-handling situation such as in fuel reprocessing.

Our invention can be carried out with any of the saccharides such as sucrose, glucose, and fructose. Other less common sugars such as lactose could be used, but the high cost of these make them impractical for the purpose of the invention.

Preferably the saccharide should be added in aqueous solution form to the radioactive waste solution. The molarity of the saccharide solution is preferably around 2.5 for disaccharides such as sucrose, and about double this for a monosaccharide such as glucose. Ordinarily it is not desirable to bring the waste solution to complete neutrality, since this causes undesirable precipitates to form such as those of iron, but to leave the acid content about half normal. We have found that about one mole of disaccharide is sufficient to eliminate from about 17 to 22 moles of nitric acid; this is temperature dependent, 17 moles of acid being destroyed per mole of disaccharide at a pot temperature of 95° C., and as high as 22 moles at a pot temperature of 100° C. Monosaccharides would, of course, require double these molar quantities to produce the same result. In order that all the sugar be destroyed these maxima should not be exceeded.

The last mentioned variation in efficiency, which is temperature dependent, is in contrast to the virtual independence of the efficiency of the reaction from acid concentration. A series of acid solutions containing from 8 M to 0.5 M nitric acid were tested by adding sucrose and determining the efficiency of the sucrose-nitric acid reaction. No significant differences were found.

As was previously mentioned, iron ions in the solution substantially affect the efficiency of the reaction. In a series of experiments in which the iron ion concentration was varied from 0 to 1 mole per liter of 6 molar nitric acid, the efficiency varied from 14.5 to 20.6 moles of acid per mole of disaccharide sugar consumed.

By a series of experiments we have found that 85° C. is the minimum temperature for initiating the reaction, and this may be as high as the boiling point of the solution. If this initiating temperature is held for a period of about four minutes the temperature may then be reduced as low as 50° C., and still the reaction will proceed vigorously, while remaining easy to control. Below 50° C. the reaction substantially ceases, but curiously, if a batch has once had the four minute initiating treatment, the reaction may be restored in it merely by re-establishing the 50° C. temperature once more. This may be due to some kind of complex formation during the initiating period, or may possibly be due to some effect of the radioactivity. As previously stated, the theoretical explanation of our invention has not been established, and it is offered on the basis of actual findings from experiments.

EXAMPLE I

In this example an actual radioactive waste solution was treated, resulting after the extraction of the uranium and plutonium values from spent fuel elements dissolved in aqueous nitric acid. Its composition was as follows:

| Constituent: | Molarity |
|---|---|
| $H^+$ | 4.8 |
| Fe (III) | 0.5–1.0 |
| Al (III) | 0.1 |
| Ni (II) | 0.2 |
| Cr (III) | 0.1 |
| $Na^+$ | 0.68 |
| $NO_3^-$ | 5.3 |
| $SO_4^=$ | 0.7 |
| $PO_4^=$ | 0.01 |
| Fission products | Trace |

To 500 ml. of this solution there was added all at once 40 ml. of 2.5 M aqueous sucrose, and this was heated quickly to 100° C. and kept at that temperature for 2.5 hours.

Despite the drastic conditions described, which were intended to simulate a worst possible case, the reaction, while vigorous, remained controllable, and while oxides of nitrogen were evolved copiously, there was little tendency for the reaction mixture to foam.

After 2.5 hours the heating was discontinued and the reaction product analyzed and the nitrate concentration was found to have fallen from 5.3 M to 1.06 M. This is equivalent to about an 80 percent denitration, and an efficiency of 21 moles of nitric acid destroyed per mole of sucrose.

EXAMPLE II 400 ml. of a synthetic aqueous waste solution, 0.5 M in $Fe^{+3}$ and 4.4 M in $NO_3^-$, were heated with 40 ml. of 2.5 M aqueous sucrose for 24 hours at 95° C. The nitrate, hydrogen ion and carbon contents of the solution were analyzed periodically as shown, the left hand column denoting lapsed time from the start of the experiment:

| Time (Minutes) | Nitrate (M) | $H^+$ (M) | Carbon (g./l.) |
|---|---|---|---|
| 0 | 4.0 | 3.6 | 33 |
| 20 | 2.4 | 2.6 | 32 |
| 60 | 1.3 | 2.2 | 20 |
| 300 | 0.86 | 1.3 | 13 |
| 480 | 0.76 | 1.0 | 9.4 |
| 1,440 | 0.56 | 0.2 | 1.9 |

The experiment showed an over-all destruction of 15 moles of nitrate per mole of sucrose.

EXAMPLES III–XIII

Four substantially identical batches of aqueous synthetic waste solution had the following components in common:

| Component: | Molarity |
|---|---|
| $Na^+$ | 0.68 |
| $Fe^{+++}$ | 0.80 |
| $Al^{+++}$ | 0.10 |
| $Cr^{+++}$ | 0.10 |
| $Ni^{++}$ | 0.02 |
| $SO_4^{--}$ | 0.72 |
| $PO_4^{---}$ | 0.01 |

The concentrations of hydrogen ion and of nitrogen in the form of nitrous and nitrate ion of the four batches is shown in the following Table I, the runs in which the batches were subsequently used, being shown below the batch numbers:

*Table 1*

| Component | Batch 1 (Runs 1–4) | Batch 2 (Runs 5–7) | Batch 3 (Runs 8–9) | Batch 4 (Run 10) |
|---|---|---|---|---|
| $H^+$ | 5.2 | 4.9 | 5.1 | 6.14 |
| $NO_2^- + NO_3^-$ | 7.0 | 7.4 | 7.2 | 8.2 |

The above batches were used in ten different runs according to the invention, the batches used in the particular runs being already indicated in the above compilation. Each run had 25 liters of synthetic waste solution, to which was added aqueous sucrose solutions at various rates throughout the run. The sucrose concentration in the sucrose solution used in runs 1 through 9 was 2.5 M, and in run 10 it was 1.4 M. The reaction temperature was 100° C. in all runs except run 10, where it was 95° C.

An induction period of six to nine minutes was observed in each run before the reaction started. The length of the induction period increased as initial sugar addition rates were reduced. Gentle air sparging reduced the induction period by a factor of two.

As the reaction proceeded the temperature of the off-gas was measured from time to time, and at the end of the run the reaction mixture was cooled and its volume measured; the percentage of volume decrease during the reaction was then calculated. The results of these measurements, together with rates of sucrose addition in ml./min. and the duration of the respective rates is shown for all runs in Table II:

Table II
OPERATION DATA FOR BATCH DENITRATION

| Run No. | Sugar Added, Moles | Sugar Addition | | Maximum Off-Gas Temp., ° C. | Volume Decrease, Percent |
|---|---|---|---|---|---|
| | | Time Min. | Rate, Ml./Min. | | |
| 1 | 8.37 | 60 / 72 / 80 | 10.8 / 14.8 / 20.4 | 90 | 16 |
| 2 | 8.37 | 50 / 10 / 62 | 11.6 / 24.0 / 40.7 | 90 | 11 |
| 3 | 8.37 | 15 / 13 / 15 / 27 | 18.8 / 34.1 / 54.7 / 66.7 | 93 | 15.1 |
| 4 | 8.37 | 10 / 6 / 8 / 17 | 10.8 / 66.8 / 100.0 / 120.0 | 94 | 20.7 |
| 5 | 4.37 | 8 / 19.5 | 16.2 / 83.1 | 92 | 8.6 |
| 6 | 5.12 | 195 / 120 / 60 / 30 / 15 | 4.1 / 4.66 / 5.16 / 7.0 / 11.3 | 48 | 6.0 |
| 7 | 5.12 | 380 / 39 | 4.71 / 6.6 | 91 | 8.0 |
| 8 | 6.40 | 245 | 10.45 | 95 | 25.4 |
| 9 | 5.12 | 277 / 51 | 5.56 / 10.0 | 65 | 5.3 |
| 10 | 6.84 | 720 | 6.79 | 85 | 0.3 |

Table III below gives further data of the runs, showing from the left digestion time, or time of run after sucrose addition was complete, the molar concentration of the product in hydrogen ion, nitrate ion and residual carbon, and moles of free acid or $NO_3^+$ plus $NO_2^+$ ion destroyed per mole of sucrose added, the column at the extreme right being based on initial and final analysis of $NO_3^-$ and $NO_2^-$ ions, and the immediately preceding column being based on the free $HNO_3$ analyses at the same time.

Table III
PRODUCT CONCENTRATION

| Run No. | Digestion Time, Hrs. | $H^+$, M | $NO_3^-$, M | Residual Carbon, Percent | Moles Destroyed | |
|---|---|---|---|---|---|---|
| | | | | | Per Mole | Sugar Fed |
| 1 | 4.25 | 0.38 | 1.5 | | 14.6 | 17.1 |
| 2 | 4.5 | 0.72 | 1.3 | | 13.6 | 17.4 |
| 3 | 0 | 2.5 | 3.0 | | 9.2 | 13.3 |
| | 5 | 0.09 | 1.3 | 35.2 | 15.3 | 17.6 |
| 4 | 0 | 1.8 | 2.0 | | 11.3 | 16.2 |
| | 3 | 0.54 | 1.1 | 48.3 | 14.2 | 18.3 |
| | 6 | −0.1 | 0.97 | 29.7 | 15.9 | 18.6 |
| 5 | 0 | 3.7 | 5.2 | | 8.7 | 15.1 |
| | 3 | 2.0 | 3.9 | 31.6 | 17.6 | 21.9 |
| | 6 | 1.6 | 3.7 | 16.3 | 19.7 | 23.0 |
| | 11 | 1.3 | 3.8 | 1.5 | 21.2 | 22.5 |
| | 16 | 1.3 | | 0.7 | 21.2 | |
| 6 | 0 | 2.5 | 3.8 | 31.5 | 12.5 | 18.7 |
| | 6 | 1.4 | | | 17.5 | |
| | 9 | 1.3 | 3.3 | 5.0 | 17.9 | 21.0 |
| | 12 | 1.2 | 3.3 | 1.4 | 18.4 | 21.0 |
| 7 | 0 | 2.3 | 3.7 | | 13.6 | 19.5 |
| | 6 | 1.3 | 3.5 | 5.0 | 18.1 | 20.4 |
| | 9 | 1.3 | 3.4 | 4.0 | 18.1 | 20.8 |
| | 11 | 1.1 | 3.4 | 2.7 | 19.0 | 20.8 |
| 8 | 0 | 1.9 | 3.2 | | 14.4 | 18.8 |
| | 3 | 0.72 | 2.5 | | 17.8 | 20.8 |
| | 6 | 0.27 | 2.5 | 14.8 | 19.1 | 20.8 |
| | 12 | 0.06 | 2.5 | 6.1 | 19.7 | 20.8 |
| 9 | 0 | 3.1 | 4.2 | | 10.6 | 15.7 |
| | 6 | 2.1 | 3.9 | | 15.2 | 17.1 |
| | 9 | 1.9 | 3.9 | 8.2 | 16.1 | 17.1 |
| | 12 | 1.8 | 3.8 | 4.2 | 16.5 | 17.6 |
| 10 | 0 | 2.0 | 3.4 | | 15.1 | 17.6 |
| | 3 | 1.4 | 2.8 | | 17.3 | 19.7 |
| | 6 | 1.1 | 2.9 | 7.8 | 18.4 | 19.4 |
| | 9 | 1.0 | 2.8 | 4.0 | 18.8 | 19.7 |
| | 12 | 0.94 | 2.9 | 1.9 | 19.0 | 19.4 |
| | 15 | 0.96 | 2.9 | 1.06 | 18.9 | 19.4 |
| | 18 | 0.90 | 2.9 | 0.38 | 19.2 | 19.4 |

From the foregoing table it is apparent that the invention provides an efficient and thorough method of removing not only nitric acid from a solution, but nitrate and nitrous ions in excess of the hydrogen ions present.

All the above reactions run smoothly, with no control difficulties.

It will be understood that this invention is not to be limited to the details given herein, but that it may be modified within the scope of the appended claim.

The embodiments of the invention in which an exclusive property or privilege is claimed are defined as follows:

A method of reducing the concentration of members of the class consisting of nitric acid, nitrous ion and nitrate ion in a radioactive aqueous solution produced by dissolving spent fuel elements from a nuclear reactor, comprising adding a disaccharide to the solution in the ratio of one mole of disaccharide to form about 17 to about 22 moles of said class members, heating the solution to a temperature of between 85° C. and the boiling point of the solution and maintaining it thereat for at least four minutes, and thereafter maintaining the temperature of the solution at between 50° C. and the boiling point until the residual carbon of the disaccharide is completely destoyed.

References Cited by the Examiner
UNITED STATES PATENTS 2,121,919  6/38  Link et al. _____ 127—70

OTHER REFERENCES

"Handbook of Chemistry and Physics," Thirty-third edition, 1951–1952, pages 1902–1903.

AEC Documents: HW-61635, Quarterly Progress Report, June 15, 1959, pages 6–9.

CARL D. QUARFORTH, *Primary Examiner.*